INVENTOR
Peter Petrovsky
BY Spencer & Kaye
ATTORNEYS

Sept. 5, 1967           P. PETROVSKY          3,339,917
SEPARATING DEVICE INCORPORATING MEANS FOR
SELECTIVELY CONVEYING ONE FLAT ARTICLE
Filed June 10, 1965     AT A TIME FROM A SEPARATING ZONE     3 Sheets-Sheet 2

INVENTOR
Peter Petrovsky

BY *Spencer & Kaye*

ATTORNEYS

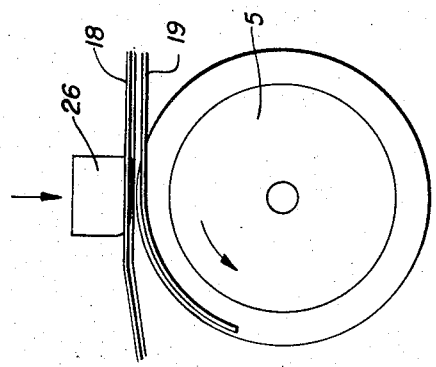
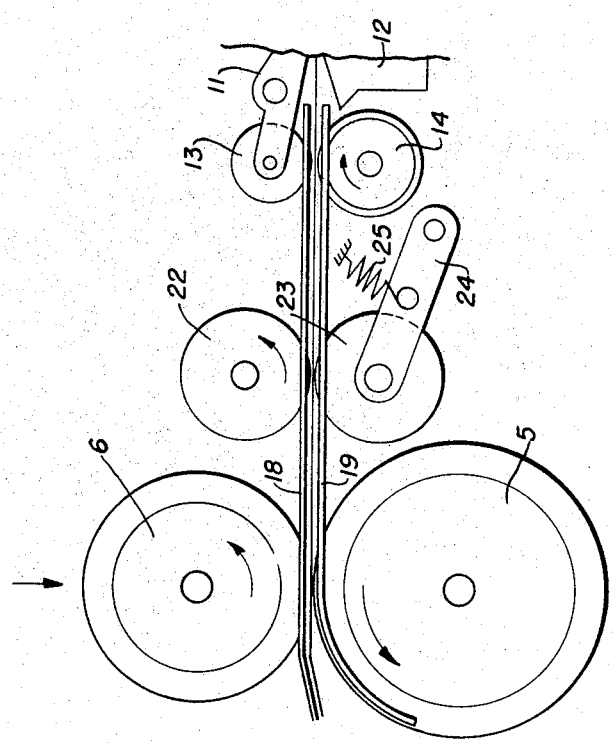

United States Patent Office 3,339,917
Patented Sept. 5, 1967

3,339,917
SEPARATING DEVICE INCORPORATING MEANS FOR SELECTIVELY CONVEYING ONE FLAT ARTICLE AT A TIME FROM A SEPARATING ZONE
Peter Petrovsky, Constance, Germany, assignor to Telefunken Patentverwertungsgesellschaft m.b.H., Ulm (Danube), Germany
Filed June 10, 1965, Ser. No. 462,871
Claims priority, application Germany, June 10, 1964, T 26,343
16 Claims. (Cl. 271—36)

ABSTRACT OF THE DISCLOSURE

A separating device for feeding flat articles and arranged to prevent double withdrawals of the articles and to selectively convey one article at a time from a separating zone, the device including selectively actuatable stop means for stopping each article, guide means for urging the article toward the stop means and restraining means disposed opposite the guiding means for preventing more than one article at a time from being fed as far as the stopping means, the distance between the stopping means and the restraining means being shorter than the length of the shortest article to be conveyed so as to insure that only one article at a time will come under the influence of the guiding means.

---

The present invention relates generally to the flat article separation art, and, more particularly, to a separating device for preventing double withdrawals of articles and for selectively conveying articles from the separating zone.

Devices are already known which use a constantly rotating friction roller which serves to effect the separation and is situated in the region of a pile of articles or documents. A restraining member follows the friction roller at a distance which is shorter than the length of a document, and a guide member is arranged opposite to the restraining member at a distance of less than the thickness of two documents, and which, jointly with said restraining member, prevents the simultaneous passage of more than one document.

Devices with such features for the continuous separation of documents are already known. The British Patent No. 787,495 is an example, in which a device is described wherein a friction roller acts on a pile of flat articles. At a distance from this roller which is shorter than the shortest document to be handled, there is provided a double roller which acts on the other side of the documents. The conveying direction of this roller is counter to the direction in which the documents are conveyed. One part of this roller coacts by friction with a pivotally mounted idler roller, while the other part coacts, during a specific period of time, with a cam plate rotating continuously in the direction of rotation of the friction roller. Finally, downstream of this "reversely rotating" double roller, there is also provided a plurality of conveyor rollers which form the conveyor path.

This device has the following mode of operation. A document is separated by the friction roller and pushed forwards as far as the reversely rotating roller. Since the cam plate is not in engagement with the one portion of the double roller at this moment, the document is held back by the other portion of the reversely rotating double roller and the idler roller coacting therewith by friction. The same thing occurs in the event of double withdrawals. Only when the cam plate during its revolution can again coact with the double roller by means of its cam—the idler roller being swung away at the same time—is the document advanced in the conveying direction as a result of greater entrainment force of the cam plate in comparison with the reversely rotating double roller and is transferred to the delivery conveyor rollers. Any double withdrawal which may occur, on the other hand, can not pass the double roller and is only advanced after the next revolution of the cam plate.

By means of devices of the kind just described, it is possible to separate items having the same spacing between their leading edges, but it is not possible to separate items in a controlled manner, that is to say by calling them up in any desired sequence in time. In addition, with the known devices it is impossible to achieve a very high separating speed.

Furthermore, devices are already known wherein the documents are continuously separated by friction and wherein pairs of conveyor rollers at the exit have a higher speed than the friction roller effecting the separation. By these means it is possible to increase the spacing between the rear edge and the leading edge of two successive documents, which is generally small in friction separators of the kind described above.

Finally, when handling documents of equal thickness in friction separators, it is already known to prevent double withdrawals by mounting a reversely rotating roller in the conveyor path, which roller forms, together with a fixed wall, a gap which corresponds substantially to the thickness of the documents.

With this in mind, it is a main object of the present invention to provide a separator which can release separated items upon command.

It is another object to provide a separator which has a very high separating speed.

These objects and others ancillary thereto are accomplished according to preferred embodiments of the invention wherein a controllable stop member is arranged behind the restraining member in the direction of conveying. This stop member, in a first position, steps the document and, as a result of a control signal, assumes a second position in which it releases the document for reacceleration. The distance between the restraining member and the stop member is shorter than the length of the shortest document.

A restraining roller rotating counter to the direction in which the documents are being conveyed may preferably serve as a restraining member. A roller rotating in the direction in which the documents are being conveyed has proved particularly advantageous to serve as a guide member.

A further feature of the invention is that an accelerating member is provided, which is operatively associated with the stop member and, on release of the document by the latter, comes into engagement with the document.

According to a further feature of the invention, the sensing and accelerating members comprise a two-armed lever which is pivotable about a shaft by means of an actuating member. One end of this lever, in cooperation with a fixed block, forms a stop for stopping the documents. On the other end there is mounted a freely rotatable roller. A roller is situated opposite the pivotable roller on the other side of the conveyor path for the documents and is continuously driven at a higher speed than the friction roller.

Additional objects and advantages of the present invention will become apparent upon consideration of the following description when taken in conjunction with the accompanying drawings in which:

FIGURE 3 is a fragment of FIGURE 1 showing a further embodiment of the invention.

FIGURE 4 is a fragment of FIGURE 1 showing another embodiment of the invention.

Figure 1:
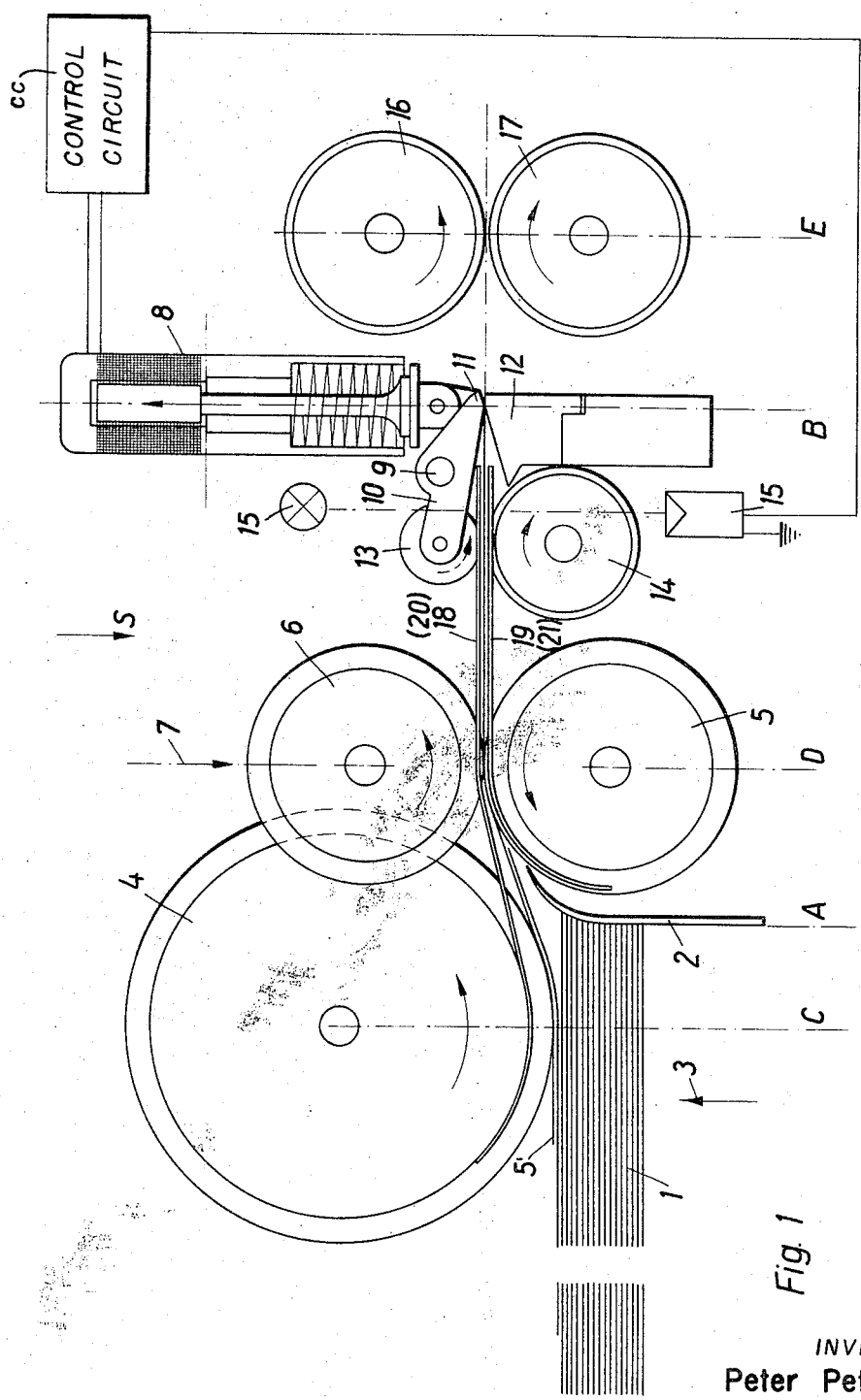
FIGURE 1 is a plan view of an embodiment of the present invention.

With more particular reference to the drawings, a pile of documents 1 is shown, the front edges of which are aligned against a stacking wall 2. This pile is subjected to a weight loading indicated by the arrow 3. A friction roller 4 of heat-hardened silicone rubber, or at least having a cover of such material, which rotates in counterclockwise direction and effects the separation, acts on the top document 5' in the pile 1. The peripheral speed of this roller is about 2 to 2.5 meters per second.

Figure 2:
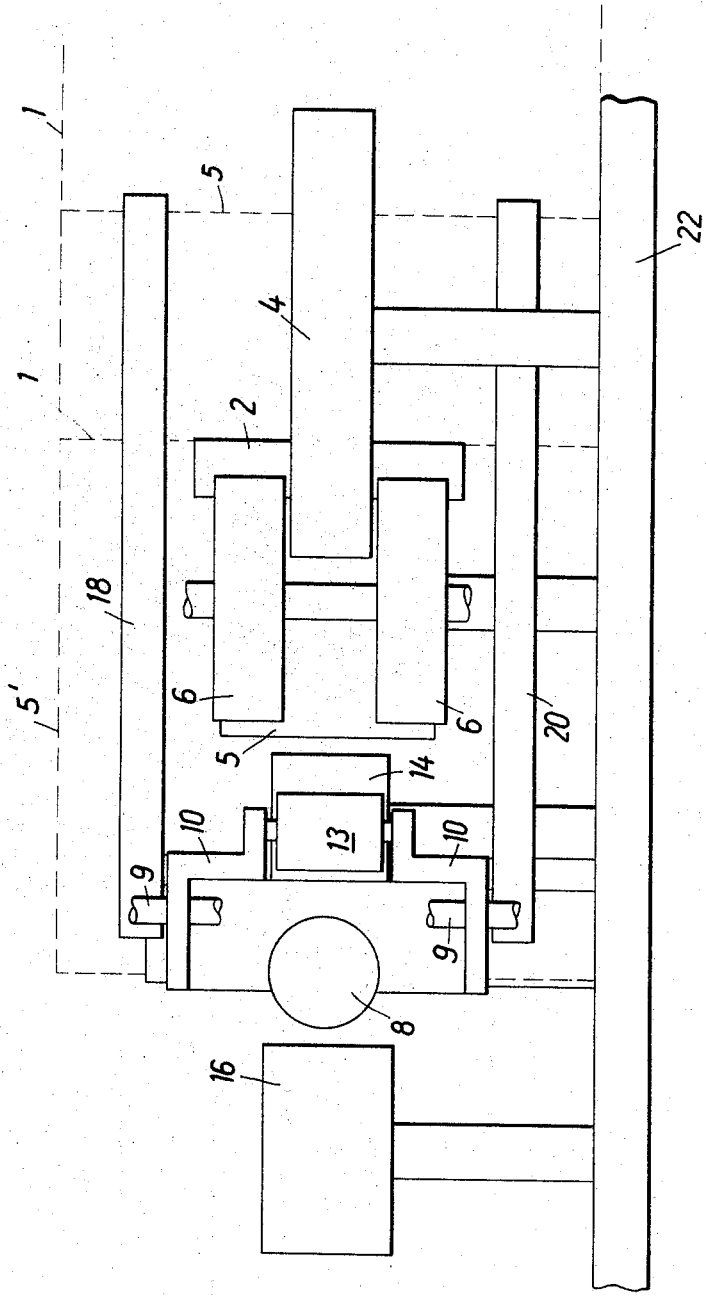
FIGURE 2 is a side view of the device shown in FIGURE 1 viewed in the direction of arrow S and with the photoelectric sensor omitted.

Downstream of the friction roller 4 and on the opposite side of the conveyor path, is a restraining roller 5, the rotation of which is in counterclockwise direction and the peripheral speed of which is lower than that of the friction roller, about 1.5 meters per second. It has been found that such a speed is perfectly adequate to prevent double withdrawals whereas higher speeds would only unnecessarily increase the stress on the leading edges of the documents without any improved restraining effect. Situated opposite the restraining roller 5 is a resiliently mounted roller 6 which rotates at the same speed and in the same direction of rotation as the friction roller 4. For reasons of design, namely in order to obtain a reliable guiding of the documents, the roller 6 is constructed in the form of a double roller (see FIGURE 2). The mounting of the roller 6 (not illustrated in FIGURE 2 for the sake of clarity) is such that a gap corresponding to the thickness of the thinnest of the documents to be handled always remains between the two rollers 5 and 6, but the roller 6 can yield, against a spring force represented by arrow 7, in the event of thicker documents.

The part of the device described so far corresponds substantially to that which is already known through the prior art. The documents are advanced by such a device in a continuous sequence, possibly partly overlapped. Double withdrawals are prevented by the restraining roller 5. As a result of the use of the stop member according to the invention and its arrangement at a specific distance from the restraining roller, separation controlled by call-up is possible. If a document has been stopped at the stop member, any further documents subsequently advanced are rejected by the restraining roller until the waiting document has been relesaed for re-acceleration by the stop member.

The stop and re-acceleration member follows the rollers 5 and 6 at a distance of less than the length of one document in the direction in which the documents are being conveyed. This member comprises a two-armed lever 10 which is pivotable about a pin 9 by an actuating magnet or solenoid 8. One end 11 of this lever is wedge-shaped and, together with a Teflon block 12, forms a stop which can be controlled. Mounted at the other end of the lever 10 is a roller 13. Opposite this roller 13, there is mounted a fixed roller 14 which rotates at a higher speed than the friction roller 4, for example, 3.8 meters per second. These rollers 13 and 14 are constantly slightly biased against one another so that each document which arrives receives a slight advancing impulse, but is not damaged by too powerful an engagement of these rolls while waiting at the stop member. Finally, a photoelectric sensor 15 is also provided in the region of the stop and acceleration member to check the presence of a document.

Following the stop 11, 12, conveying means such as belts or delivery rollers 16 and 17 are mounted, which are driven at the same or a higher speed as the roller 14. Finally, guide rails 18 to 21 are provided at each side of the conveyor path for the documents, above and below the range of action of the rollers 4, 5, 6, 13 and 14, in order to obtain a satisfactory guiding of the documents. The entire device is mounted on a base plate 22 which also forms the plane of travel for the documents.

In the example described, the distance from the stop member to the friction roller 4, that is to say, the distance B–C, is so selected that it is smaller than the shortest document to be handled. Within the scope of the invention, however, it is also possible to select this distance longer than the length of the documents, but the distance B–D from the stop member to the restraining roller must always remain smaller than the document length because otherwise the device would no longer work correctly because of a possible blockage at the stop member. In such an embodiment, the roller 6 must be rigidly mounted and consequently be adjusted together with the restraining roller to a specific thickness of document which in turn presupposes documents of uniform thickness. Such a rigid mounting of the roller 6 is necessary because otherwise, when the top document has been withdrawn from the pile and reached the stop member, the friction roller would already advance the next document from the pile and push it between the waiting document and the restraining roller 5 as a result of the greater entrainment force of the friction roller 4 in comparison with the restraining roller 5. Consequently, it would no longer be possible to prevent double withdrawals.

Within the scope of the invention, it is also possible to provide a further pair of rollers between the rollers 5, 6, and 13, 14, in the conveyor path. One roller of this further pair is driven at the same speed as the friction roller 4. The other roller is in engagement, through spring force, with the driven roller and could take over the conveying of the documents between the roller 6 and the waiting station. With such a construction of the device it is no longer necessary for the rollers 13, 14 to be constantly in gentle engagement and it is sufficient if they are merely brought into engagement with one another for the purpose of accelerating a document.

Finally, it is also possible within the scope of the invention, particularly in a device such as described in the preceding paragraph, to replace the roller 6 by a non-rotating guide member 26 (FIGURE 4), which would, however, be subject to the same conditions as the roller 6 with regard to its distance from the restraining roller 5.

In view of the detailed description, the mode of operation of the device according to the invention should be easily understood. The top document 5' is withdrawn from the pile by the continuously driven friction roller 4, and is advanced along the conveyor path against the restraining force of the restraining roller 5. It is gripped by the accelerating rollers 13, 14, with a slight slip and advanced as far as the stop member 11, 12, while at the same time it is detected by the photoelectric sensor 15. The rear end of this document still extends back into the pile and prevents another document from being separated by the friction roll. If, for any reason, the next document in the pile is likewise withdrawn during the separation of the document 5' (double withdrawal), the next document only reaches the restraining roller 5. This roller has a higher frictional force in relation to the document than do two documents in relation to one another, and pushes it back toward the pile out of its range of action.

This action continues until the document 5' is conveyed out of the device as a result of a call-up signal. This occurs for example when the control circuit CC receives an indication from sensor 15 that a document is stopped and a release condition such as the closing of a switch in circuit CC causes it to energize solenoid 8. It attracts its armature, swings the stop 11 out of the conveyor path as a result and at the same time brings the accelerating rollers into powerful engagement with the document as a result of which it leaves the device at an increased speed in comparison with the separating operation and is taken over by the conveyor rolls 16, 17. As soon as the rear edge of this document has left the rollers 5, 6, the document waiting there follows on and passes these two rollers. Because of the increased withdrawal speed of the first document, a gap occurs between the two succeeding documents and this gap is sufficient to permit the closing of the stop member 11, 12 again in good time and to stop the fresh document which arrives.

It can thus be seen that in one embodiment, the distance (B-D) between the stop member and the restraining member is shorter and the distance (B-C) between the stop member and the axis of the friction roller is larger than the length of the shortest document. A fixedly mounted roller, which is driven in the direction in which the documents are conveyed, is situated opposite the restraining member as a guide member.

In another embodiment of the invention, the distance (B-C) between the stop member and the axis of the friction roller is shorter than the length of the shortest document, and a resiliently mounted roller, which is driven in the direction in which the documents are conveyed, is situated opposite the restraining member as a guide member. The mounting of this roller is such that there is always a minimum gap of the thickness of the thinnest document to be handled between these two members.

A problem which is solved by using a special material for the friction roller, is that the friction roller effecting the separation has to have an adequate entrainment force in order to separate a document cleanly but on the other hand, it also has to have a certain slip so as not to damage a document waiting at the stop member, it being noted that the rear end of such a document still lies within its range of action in the preferred embodiment of the invention. With this rubbing against the document with a slip of 100%, the friction roll must not be soiled by paper dust. This problem would be convincingly solved by using heat-hardened silicone rubber as material for the friction cover of the friction roller.

In order to increase the entrainment force of the friction roller on the one hand and to improve the prevention of double withdrawals on the other, it is advisable to offset the friction roller towards the pile in comparison with the conveying path for the documents between the restraining roller and stop member. As a result, the angle of contact between the documents and the friction roller and the reversely rotating roller is increased.

In one arrangement of the invention, the distance (E-C) between the delivery or conveying rollers 16 and 17 and the friction roller 4 is smaller than the shortest document to be processed.

In FIGURE 3 there are added to the embodiment of the invention shown in FIGURE 1 two rollers 22 and 23 between the rollers 5, 6 and 13, 14 in the conveyor path. The roller 22 is continuously driven in counterclockwise direction with the speed of the friction-roller 4. The roller 23 mounted for free rotation on a pivotal lever 24 is held in gentle engagement with the roller 22 by a spring 25, which acts on the lever 24. In this embodiment of the invention the rollers 13 and 14 are not in gentle engagement with one another when stopping documents, but are brought into engagement only for the purpose of accelerating documents.

It will be understood that the above description of the present invention is susceptible to various modifications, changes and adaptations, and the same are intended to be comprehended within the meaning and range of equivalents of the appended claims.

What is claimed is:

1. In a device for the controlled separation of flat rectangular articles, such as documents in particular, using a continuously rotating friction roller which effects the separation and which is situated in the region of a pile of such documents, a restraining member following the friction roller at a distance which is shorter than the length of a document, and a guide member which is arranged opposite to the restraining member at a distance of less than the thickness of two documents, and which jointly with said restraining member, prevents the simultaneous passage of more than one document, the improvement comprising a controllable stop member arranged behind the restraining member in the conveying path, which stop member, in a first position, stops the document and, as a result of a control signal, assumes a second position in which it releases the documents for re-acceleration, and the distance between the restraining member and the stop member being shorter than the length of the shortest document.

2. A device for the controlled separation of flat articles such as documents, comprising, in combination:
   a continuously rotating friction roller for effecting separation and disposed adjacent a pile of a such documents;
   a restraining member following the friction roller at a distance which is less than the length of a document:
   a guide member opposite said restraining member and spaced therefrom a distance which is less than the thickness of two documents for, jointly with said restraining member, preventing the simultaneous passage of more than one document; and
   stop means following the restraining member and controllable into a first positon in which it stops a document separated from the pile by the friction roller and into a second position which releases such document and allows it to be carried away, the distance between the said restraining member and said stop means being shorter than the length of the shortest document.

3. A device as defined in claim 2 wherein said restraining member is a roller rotating in a direction opposite to that in which the documents are conveyed.

4. A device as defined in claim 2 in which the guide member is a roller rotating in the same direction in which the documents are conveyed.

5. A device as defined in claim 2 comprising accelerating means operatively associated with said stop means for engaging a document when it is released by said stop means.

6. A device as defined in claim 5 wherein said stop means and said accelerating means include a two-armed lever mounted for pivoting movement about an axis, a roller mounted for free rotation at one end of said lever, a stationary block, the other end of said lever cooperating with said block to form a stop for stopping documents, means for actuating said lever to move said other lever end to cooperate with said stationary block, and a further roller situated opposite the roller mounted for free rotation on the lever on the other side of the conveying path therefrom, said further roller being driven continuously at a speed which is higher than that of the friction roller.

7. A device as defined in claim 2 wherein the distance between the stop means and the restraining member is less than the length of the smallest document and the distance between said stop means and the axis of said friction roller is larger than the length of the smallest document, said guide member including a fixedly mounted roller which is driven in the same sense of direction as the documents are conveyed.

8. A device as defined in claim 2 wherein the distance between the stop means and the axis of the friction roller is less than the length of the smallest document, and the guide member includes a resiliently mounted roller driven in the same sense of direction as the documents are conveyed and mounted so that there is always a minimum spacing between the guide member and the restraining member which is about the thickness of the thinnest of the documents to be handled.

9. A device as defined in claim 5 comprising conveying means mounted a predetermined distance downstream of the stop means and having a conveying speed which is at least as great as that of the accelerating means.

10. A device as defined in claim 6 wherein the two rollers of the accelerating means are continuously in gentle engagement with a document in the vicinity of the stop means and the pressure of these rollers being substantially increased for accelerating a document.

11. A device as defined in claim 7 further comprising accelerating means composed of two rollers disposed opposite one another to respectively opposite sides of the path followed by the articles to be separated, wherein said two rollers of said accelerating means are continuously in gentle engagement with a document in the vicinity of the stop means and the pressure of these rollers is substantially increased for accelerating a document.

12. A device as defined in claim 9 wherein the conveying means includes a pair of conveying elements which are spaced from the friction roller a distance which is less than the smallest document to be processed, the two rollers of the accelerating means being brought into engagement with the document for purposes of accelerating it.

13. A device as defined in claim 2 comprising photoelectric sensing means disposed in the vicinity of the stop means to supervise the conveying path, and control circuit means for actuating the stop means when a selectively given call-up signal is provided for a document waiting at the stop means, but only opening the stop means when the presence of a document at the stop means is sensed by said sensing means.

14. A device as defined in claim 6 comprising a pair of conveying rollers disposed between the restraining and guide members and the rollers of the accelerating means, one of said rollers being fixedly mounted and having a peripheral speed which is the same as that of the friction roller, the other roller being in engagement with a document under the force of a spring.

15. A device as defined in claim 6 comprising a pair of conveying rollers disposed between the restraining and guide members and the rollers of the accelerating means, one of said rollers being fixedly mounted and having a peripheral speed which is the same as that of the friction roller, the other roller being in engagement with a document under the force of a spring and the accelerating means being brought into engagement with one another only for the purpose of accelerating a document.

16. A device as defined in claim 2 wherein the restraining member is a restraining roller having a peripheral speed which is lower than that of the friction roller.

References Cited

UNITED STATES PATENTS

| 2,950,675 | 8/1960 | Copping et al. | 271—36 X |
| 3,072,397 | 1/1963 | Kelchner | 271—60 X |
| 3,108,801 | 10/1963 | Van Dalen | 271—57 |
| 3,173,684 | 3/1965 | Binzoni et al. | 271—36 X |

OTHER REFERENCES

Tappi, March 1965, vol. 48, No. 3, page 13A.

M. HENSON WOOD, Jr., *Primary Examiner.*

J. N. ERLICH, *Assistant Examiner.*